United States Patent [19]

Penrose

[11] Patent Number: 4,650,684
[45] Date of Patent: Mar. 17, 1987

[54] REDUCTION IN PHASE-LOCKING OF CORRUGATED CHIPS AND PRODUCT THEREOF

[75] Inventor: Newton B. Penrose, Plano, Tex.

[73] Assignee: Frito-Lay, Inc., Dallas, Tex.

[21] Appl. No.: 796,262

[22] Filed: Nov. 8, 1985

[51] Int. Cl.⁴ ............................................. A23L 1/217
[52] U.S. Cl. ................................... 426/144; 426/518; 426/637; 426/808
[58] Field of Search ............... 426/144, 637, 438, 441, 426/808, 518

[56] References Cited

U.S. PATENT DOCUMENTS

| 678,514 | 7/1901 | Regnier . | |
|---|---|---|---|
| 2,681,674 | 6/1954 | Stahmer . | |
| 2,769,715 | 11/1956 | Stahmer . | |
| 3,956,517 | 5/1976 | Curry et al. | 426/502 |
| 4,011,033 | 3/1977 | Willemsen | 425/302 |
| 4,219,575 | 8/1980 | Saunders et al. | 426/242 |
| 4,503,127 | 3/1985 | Fan et al. | 426/438 |
| 4,508,739 | 4/1985 | Ryan | 426/144 |
| 4,511,586 | 4/1985 | Fitzwater et al. | 426/144 |

FOREIGN PATENT DOCUMENTS 701899 1/1965 Canada .

Primary Examiner—Arthur L. Corbin
Attorney, Agent, or Firm—Bernard, Rothwell & Brown

[57] ABSTRACT

A method of reducing phase-locking of fried snack food chips having corrugations on both surfaces includes forming at least some of the corrugations non-complementary so that corrugations of adjacent slices will not mate and surface tension of a washing or frying liquid will not cause an undersirable amount of phase-locking. A chip having a configuration with three spaced widened ridge corrugations is disclosed as is a blade shaped to provide such chip.

9 Claims, 6 Drawing Figures

REDUCTION IN PHASE-LOCKING OF CORRUGATED CHIPS AND PRODUCT THEREOF

BACKGROUND OF THE INVENTION

1. Field of the Invention

This invention relates to improvements in a snack food product, process and apparatus for producing the same, and more particularly to the reduction in phase-locking of corrugated snack food chips.

2. Background Art

Corrugated or ridged snack food chips, e.g., potato chips, are well known and well liked by consumers. Frito-Lay, Inc., assignee of this invention, makes and sells substantial amounts of ridged potato chips under the trademarks O'GRADYS TM and RUFFLES ®. These ridged or corrugated potato chips have corrugations on their opposing surfaces which are parallel ridges and valleys.

In the production of such chips, potatoes are cut into slices with the corrugations in the slices, washed and fried.

There has been a signficant problem in the art of such corrugated potato slices sticking together during the washing step and staying stuck together or "phase-locking" during the frying step. When the chips are phase-locked they are "clustered", and because these clusters are thicker than individual slices, they do not fry out completely and, as a result, have "soft" centers. This creates significant fried waste, which requires manual inspection and elimination. It is believed that surface tension is the cause of phase-locking of the corrugated slices. Because the corrugated slices have significantly more surface than flat chips, there is consequently more surface tension. This surface tension is so great that even significant agitation of frying oil will not separate "phase-locked" slices.

Although typically potato slices are washed in water prior to frying, one of the advances in the art of producing potato chips achieved by Frito-Lay, Inc. involves hot oil activation in which unwashed slices are heated in edible oil to activate the enzyme pectin methyl esterase, and no water is used during the washing step. This has significant advantages, see U.S. Pat. No. 4,503,127 granted Mar. 5, 1985, assigned to Frito-Lay, Inc. However, phase-locking of deeply corrugated chips such as O'GRADYS TM, shown in U.S. Pat. No. 4,511,586 granted Apr. 16, 1985, assigned to Frito-Lay, Inc., occurs to such an extent that, as a practical matter, it is uneconomical to produce O'GRADYS TM chips by use of the hot oil activation process. Even though phase-locking was considered an insurmountable problem in producing O'GRADYS TM chips according to U.S. Pat. No. 4,511,586 utilizing the hot oil activation process of U.S. Pat. No. 4,503,127, it is also a possible problem in the manufacture of chips which are not ridged as deeply as O'GRADYS TM chips, and when washing in water rather than treating with hot oil. Previous to this invention, no solution to this problem was known and Frito-Lay, Inc. stopped processing O'GRADYS TM chips using hot oil activation as it was uneconomical to employ personnel to manually pick out and throw away already-fried, but clustered and otherwise unevenly fried phase-locked chips.

SUMMARY OF THIS INVENTION

This invention provides a method of reducing phase-locking of fried corrugated potato chips by configuring at least some of the corrugations so that adjacent slices with the same corrugation will not nest together, i.e., by forming at least some but not all of the ridges of the corrugations to a configuration which is not complementary so that the ridges and valleys of the corrugations on one chip will not mate with the ridges and valleys of another chip formed in the same manner.

The invention results in a fried snack food chip having corrugated opposing faces with aperiodically selected ridges shaped non-complementary to the remaining ridges.

The invention further includes a slicer blade for a centrifugal slicer machine to produce such slices, the slicer blade, one edge which is sharpened, having a plurality of parallel ridges and valleys to produce a generally uniform corrugated surface, with selected ridges being slightly flattened and widened to interrupt the nestability of the corrugations of the slices.

DETAILED DESCRIPTION OF THE PREFERRED EMBODIMENT

Figure 1:
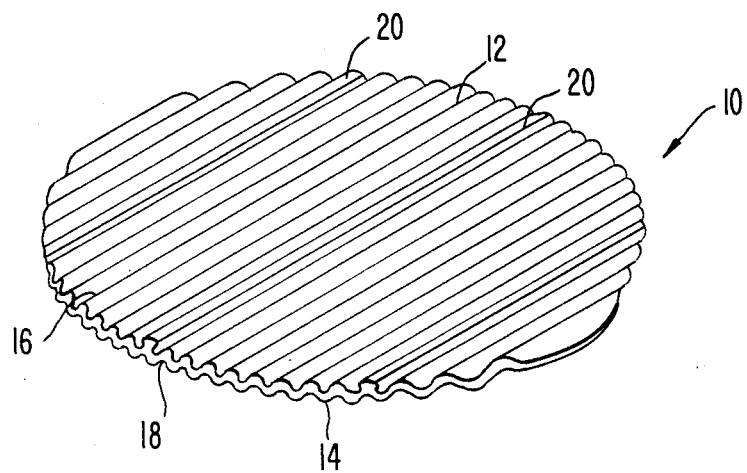
FIG. 1 is a perspective view of a potato slice of this invention formed in accordance with the method of this invention.
Figure 2:
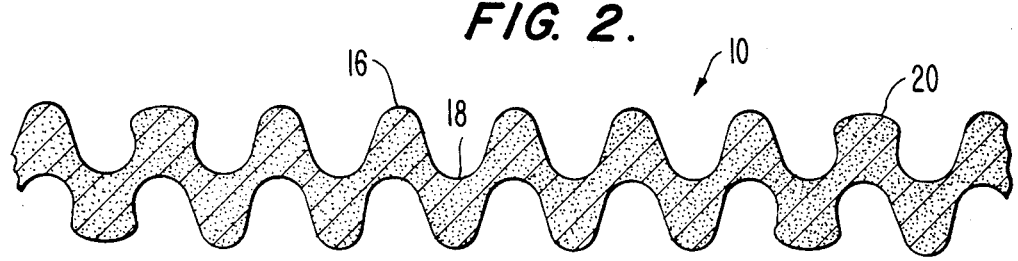
FIG. 2 is an enlarged cross-section of a broken-away portion of the potato slice of FIG. 1.

As shown in FIGS. 1 and 2, a vegetable slice 10 comprising a fried snack food chip such as a potato chip has corrugations 12 and 14 on its opposite face surfaces. These corrugations include a plurality of ridges 16 and valleys 18 which in the prior art are all normally complementary shaped. However, in the present invention in order to prevent nesting of the corrugations in the surface of adjacent slices, selected ridges 20 are configured so that they are not complementary. A preferred configuration is to flatten and widen the selected ridges 20 by cutting the slice 10 with a unique blade 21 shown in FIGS. 3 and 4.

Figure 3:
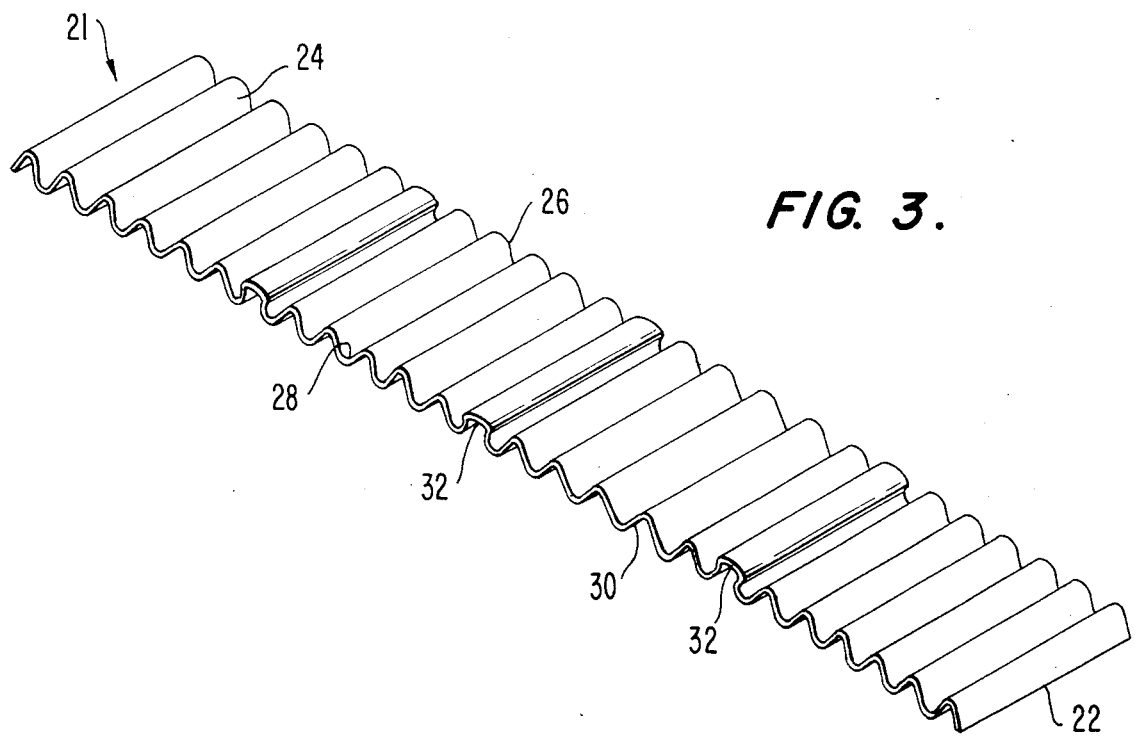
FIG. 3 is a perspective view of a cutting blade utilized in a centrifugal cutting apparatus to produce the chip of this invention.
Figure 4:
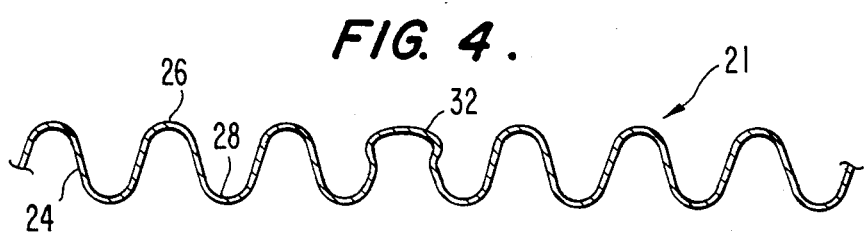
FIG. 4 is an enlarged sectional view of a portion of the cutting blade shown in FIG. 3.

FIGS. 3 and 4 illustrate the cutting blade 21 to be used in the centrifugal slicing machine. The blade is a generally rectangular metal strip 22 formed in corrugations 24 with ridges 26 and valleys 28 and having one surface edge sharpened at 30 as is conventional. The difference between the blade of this invention and the conventional Urschel slicer blade is that selected ridges or valleys 32 adjacent the sharpened edge are flattened. These flattened ridges interrupt the periodocity of the corrugations in the slice and produce a slice as described above which is the starting product for the method of reducing phase-locking.

Figure 5A:
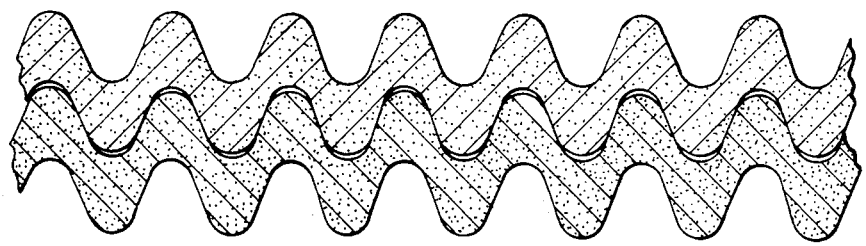
FIG. 5A is an enlarged sectional view of a portion of prior art ridged slices nested together.

FIG. 5A shows a pair of potato slices of the prior art with periodic configurations and how they mate together or phase lock together due to the surface tension between the mating surfaces.

Figure 5B:
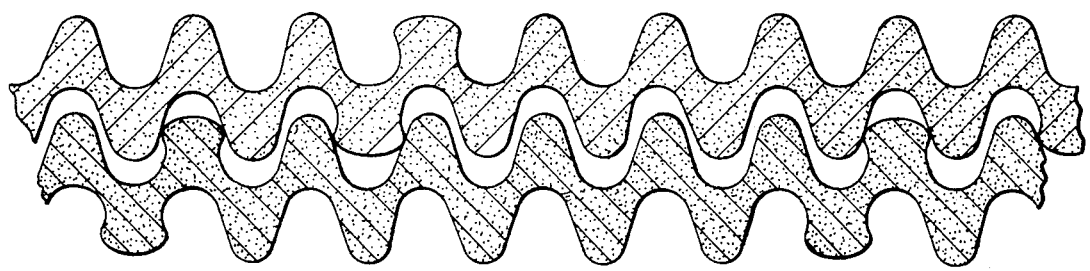
FIG. 5B is an enlarged sectional view similar to FIG. 5A but showing how ridged slices of this invention are prevented from nesting by the configuration of certain of the ridges.

FIG. 5B is a similar depiction of a pair of chips according to this invention showing how with non-conforming configuration of selected ridges, the corrugated surfaces will not mate and consequently phase-lock due to surface tension of the washing or frying liquid.

In the method of this invention the prevention of phase-locking is accomplished by forming at least some but not all of the ridges of the corrugations to a configuration which is not complementary so that the ridges and valleys of one corrugated slice will not mate with the ridges and valleys of an adjacent chip as shown in FIG. 5B. When the slices are washed the surface tension of the washing liquid will not cause them to stick together and the washed chips can be fried to produce the fried chip product. The forming of the method may be by cutting utilizing a centrifugal cutter with corrugated blades to provide the ridged configuration. The centrifugal cutter may, for example, be a centrifugal cutter as shown schematically in U.S. Pat. No. 4,511,586 which is commercially available as the Urschel Model CC-Slicer from Urschel Laboratories, Inc., Valparaiso, Ind., but which is fitted with the blade 21 shown in FIGS. 3 and 4 of the application.

As nonlimiting examples, the invention was tested by modifying blades in an Urschel slicer used to produce O'GRADYS TM chips by flattening the blade in three equally spaced positions along the blade. This produces three ridges 20 in the slices and keeps the slices from mating. One ridge 20 per slice will not work well as the edges of adjacent corrugated chips will mate when the ridge is in the center. Two ridges 20 per slice will not work as well as three ridges 20 per slice. Two ridges may be spaced so far apart that small corrugated slices would mate between adjacent ridges. The spacing of the non-conforming corrugations depends upon the size of the slice and of the corrugations. In general, it is desirable to have non-conforming corrugations (preferably three or more) in order to prevent any significant amount of nesting with the conventional size range of corrugated slices.

As can be seen, this invention provides a significant improvement in the art of potato chips, the method of making the same and of cutting the slices therefor. Such improvements solve a difficult problem of phase-locking. It is apparent that other variations may be made by those skilled in the art to the invention defined only by the scope of the following claims.

I claim:

1. A method of reducing phase-locking of fried snack food chips made from vegetable slices having parallel rows of corresponding and complementary ridge and valley configurations on both face surfaces thereof, such slices normally having an undesirable propensity to phase-lock together by surface tension during washing or frying in liquid so that they are not satisfactorily fried, the method comprising: forming in some of the corrugations on each side of the slice in a configuration which is non-complementary to the remaining configurations on each side of said slice so that the ridges and valleys on one slice will not mate with the ridges and valleys of another slice formed in the same manner, washing the so-formed slices, and frying the washed slices to produce chips.

2. A method as in claim 1 wherein there are at least three non-complementary corrugations on each side of each slice.

3. A method as in claim 2 wherein the forming is accomplished by cutting with a blade.

4. A method as in claim 3 wherein the cutting utilizes a centrifugal cutter with corrugated blades configured to provide an aperiodic ridge configuration.

5. A method as in claim 3 wherein the washing step is performed in hot oil.

6. A fried snack food chip product with a corrugated surface made in accordance with the method of claim 1.

7. In a fried vegetable snack food chip product with corrugated opposing surface faces, each corrugation having parallel and complementary ridges and valleys therein the improvement comprising: some of the corrugations on each surface of said chip having a configuration which is non-complementary to the remaining corrugations on each surface of said chip.

8. A fried snack food chip product as in claim 7 wherein there are at least three non-complementary corrugations per chip face.

9. A fried snack food chip product as in claim 7 wherein the non-complementary configurations have ridges which are shaped with a blunt widened top surface.

* * * * *